Oct. 24, 1950  W. R. TUCKER  2,526,835
HYDRAULIC MOTOR CONTROL
Filed Oct. 18, 1946  2 Sheets-Sheet 1

FIG. I

INVENTOR
WARREN R. TUCKER
BY
Toulmin & Toulmin
ATTORNEYS

Patented Oct. 24, 1950

2,526,835

UNITED STATES PATENT OFFICE 2,526,835

HYDRAULIC MOTOR CONTROL

Warren R. Tucker, Dayton, Ohio, assignor to H-P-M Development Corporation, Wilmington, Del., a corporation of Delaware Application October 18, 1946, Serial No. 704,026

7 Claims. (Cl. 60—53)

This invention relates to fluid operable control systems, and particularly to a control system adapted for controlling a plurality of fluid motors so that they operate at substantially a constant torque.

In many industrial work cycles or processes, it is desirable that a uniform torque be exerted on the work member. This is true in connection with arrangements wherein ribbons, sheets, threads or filaments of material are to be handled or conveyed through or between a plurality of processing stations. It is essential that work members of this type be maintained relatively taut but that the tension thereon be maintained within predetermined limits so that no breakage of the member occurs.

The primary object of this invention is the provision of a control system wherein a substantially uniform tension can be exerted by a fluid motor over a wide range of speeds.

Another object is the provision of a fluid operable control circuit wherein there are a plurality of fluid motors and in which the torque developed by each of the said motors is maintained substantially uniform independently of the torques on the others thereof.

It is also an object to provide a fluid operable control system for a plurality of fluid motors which may be spaced apart and each of which develops a substantially constant torque for conveying continuous work members such as threads or ribbons.

A still further object is the provision of a control system for a fluid pump-motor circuit which is operable to maintain a substantially constant horsepower rate of energy exchange in the said circuit.

These and other objects and advantages will become more apparent upon reference to the following description taken in connection with the attached drawings in which.

Figure 1:
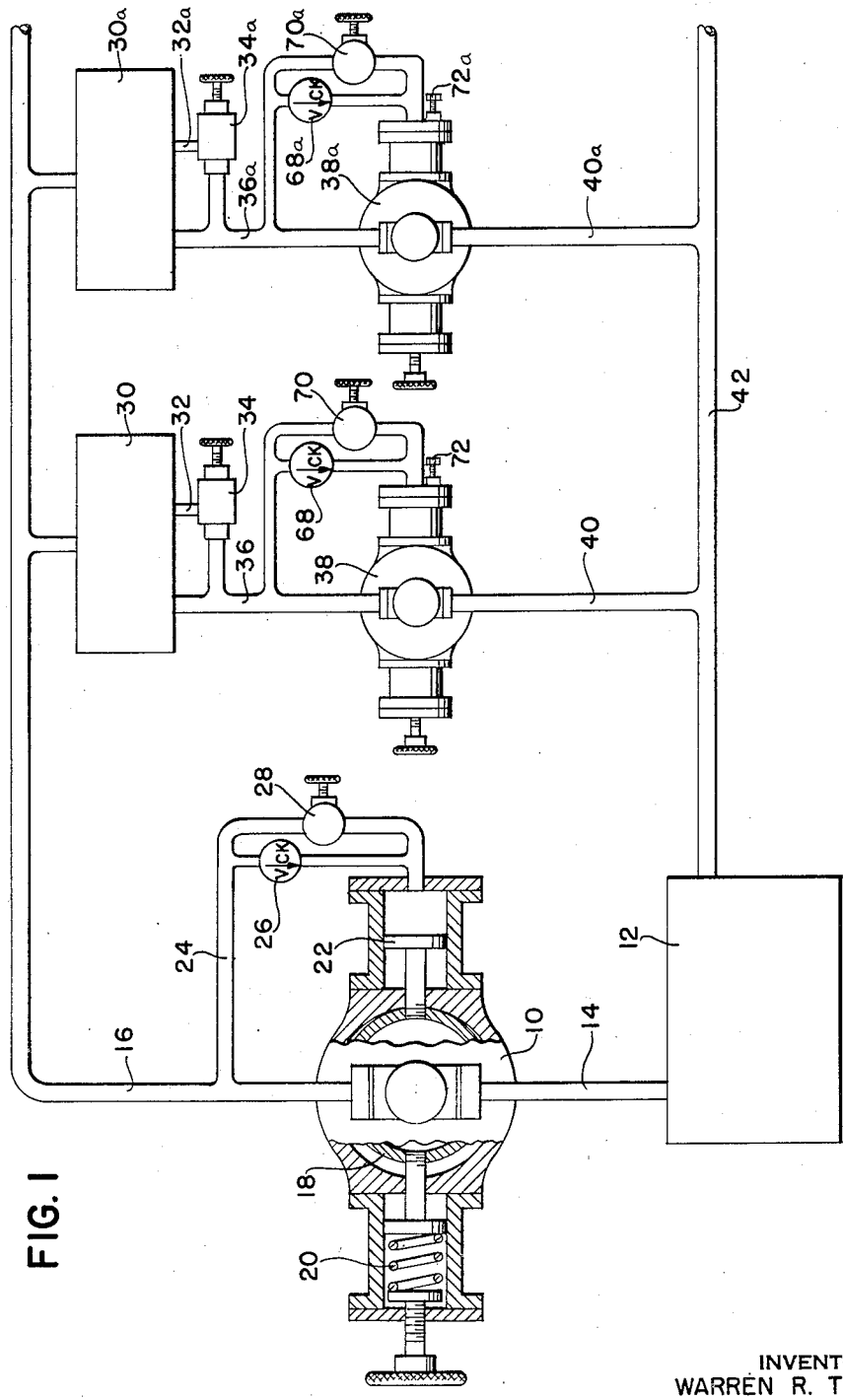
Figure 1 is a general view showing the circuit arrangement.

Referring to the drawings, there is a pump 10 which draws fluid from the reservoir 12 through a suction conduit 14 and discharges the said fluid into a pressure conduit 16. The pump includes a movable flow controlling member 18 which is continuously urged toward increased stroke position by an adjustable spring 20, and which is adapted for being urged toward decreased stroke position by a piston 22.

As will be seen hereinafter, the spring 20 preferably has a substantial modulus so that the pump gradually shifts toward zero delivery as the discharge pressure thereof increases thereby maintaining a substantially constant load on the pump driving motor and a substantially constant power load on the pump.

Fluid is conducted to the piston 22 from the conduit 16 by the conduit 24 and through the check valve 26 which opens toward the said piston. The check valve 26 is bypassed by a throttle valve 28 and the effect of the check valve 26 and choke valve 28 is to stabilize the operation of the flow controlling mechanism for the pump 10.

The conduit 16 leads to the inlets of a plurality of valve means 30, 30a which have the discharge conduits 32, 32a which lead to the inlets of the adjustable choke valves 34, 34a.

The choke valves discharge through the conduits 36, 36a to the inlets of the fluid motors 38, 38a. Each of the motors has its outlet connected by a conduit 40, 40a with an exhaust conduit 42 leading to the reservoir 12.

Figure 2:
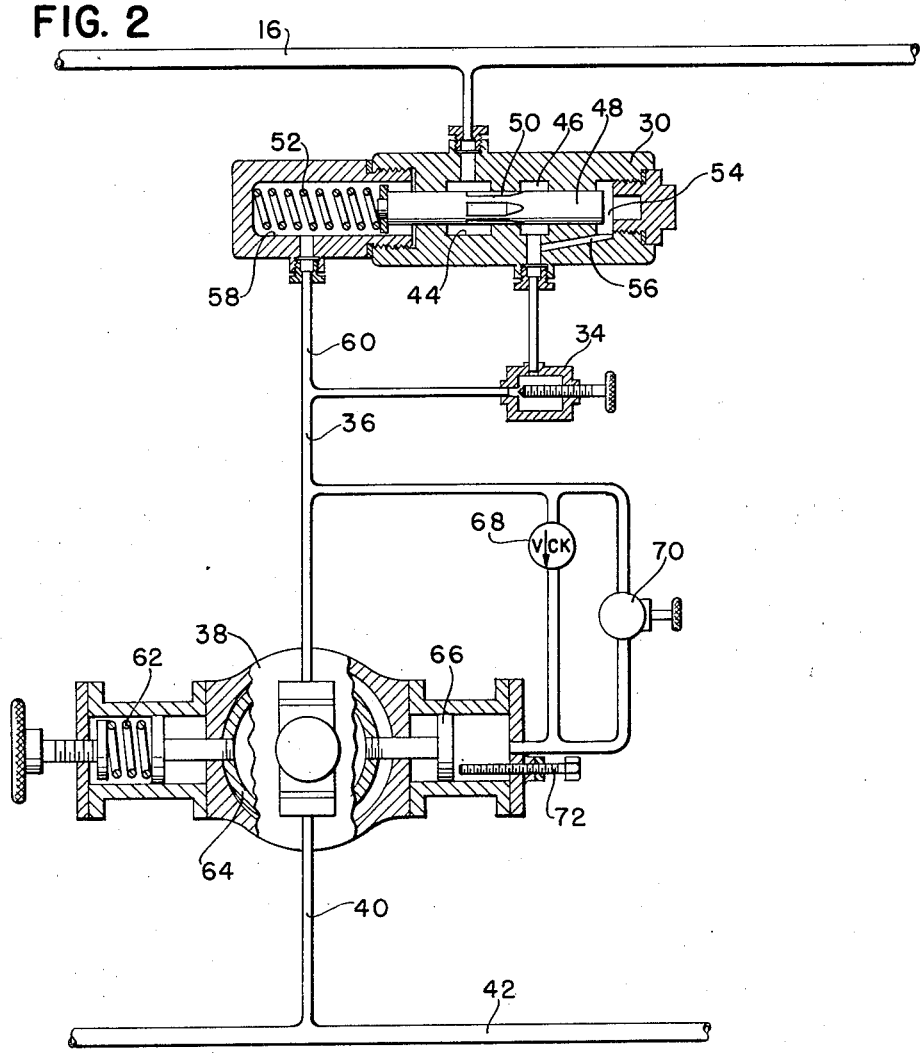
Figure 2 is a view showing more in detail the arrangement of the controls associated with the fluid motors.

Reference to Figure 2 shows the arrangement of the motor controls more in detail. In this view it will be seen that the valve 30 comprises an inlet chamber 44 and an outlet chamber 46 which are adapted for being variably connected through a valve member 48 which has the grooves 50 therein extending between the said chambers. The valve member 48 is normally urged toward the right in Figure 2 by a spring 52 in order to afford minimum restriction between the chambers 44 and 46. An actuating chamber 54 at the end of the valve member opposite the spring 52 is connected by a passage 56 to receive pressure fluid from the inlet of the choke valve 34 and thereby to urge the valve member 48 toward an increased restriction position. The spring 52 is also in a chamber 58 which is connected by a conduit 60 to receive pressure fluid from the discharge side of the choke valve 34 so that the valve member 48 is adapted for being acted on by the spring 52 and the pressure conducted thereto from the inlet and discharge sides of the choke valve 34 and thereby takes up a position wherein the rate of fluid flow through the valve is substantially constantly independent of the pressure of the fluid supply. It will be apparent that the spring 52 is relatively light and that it serves principally to bias the valve member 48 slightly toward its position of lesser restriction.

The control means directly associated with the fluid motor 38 comprise the adjustable spring means 62 which acts on the movable stroke adjusting member 64 of the fluid motor to urge the said member toward a neutral position. The action of the spring 62 is opposed by the piston 66 which receives fluid from the conduit 36 through the check valve 68 opening toward the said piston. The check valve 68 is bypassed by the choke valve 70 which combination provides for stable operation of the stroke control mechanism of the motor.

In order to prevent the stroke adjusting mechanism of the motor from ever placing the motor completely in a neutral position, there is provided a stop mechanism such as the screw 72 which abuts the piston 66 when the motor has a predetermined minimum stroke.

While the control mechanism shown in Figure 2 is that associated with the motor 38, it will be understood that all of the several motors have substantially identical control auxiliaries associated therewith.

Operation

In operation, the pump 18 is normally urged on full stroke position by the spring 29. At the same time, each of the motors is urged toward minimum stroke position by its associated control spring. As the pump delivers fluid to the conduit 16, the rate of fluid flow from the conduit 16 to each of the motors is controlled by the flow control valve 30 associated with the said motor. As mentioned before, the rate of fluid flow through the valves 30 is substantially independent of the inlet and outlet pressure thereof. Thus, the pressure at the inlet of each of the motors will vary in accordance with the stroke thereof. Accordingly, as the pump 18 delivers fluid through the valve 30 to the conduit 36, there is a rise in pressure acting on the pistons 66 which urges the several motors toward increased stroke position. As the motors rotate and perform work on the work member, it being considered that the work member is a continuous thread, ribbon or sheet, the inlet pressures of the several motors will vary in accordance with the resistance of the work member to the motor. Thus, if the motor is operating at a speed which creates a certain tension in the work member then there will be a predetermined pressure in the conduit 36 acting on the piston 66 to move the flow control member 64 against the spring 62. If this pressure is sufficient to so move the piston 66, then the motor will move toward increased stroke position and there will be a reduction in the speed thereof. The reduction in speed will occur because of the flow controlling valve 30 which maintains a substantially constant supply of actuating fluid to the motor. With the speed of the motor reduced, the resistance exerted thereon by the work member will decrease so that the pressure in the conduit 36 will also decrease and the spring 62 will again commence to move the motor toward the decreased stroke position.

From the foregoing, it will be apparent that each of the several motors will automatically assume a position of balance under the influence of the spring 62 and piston 66 such that a substantially constant torque is developed on the work member. It will be evident that if the processing of the work member is such that its length is changing then the motors 38 will automatically adjust their speed to compensate for the said changes. Accordingly, the several motors, having been once adjusted in order to maintain the proper tensions in the work member, thereafter require no further attention until the work cycle is changed for some reason. It will also be noted that the stroke of the pump 10 is continuously automatically adjusted in accordance with the amount of fluid required by the several motors so that there is no wasting of power in the circuit other than the small amount required for actuating the control devices.

It will be understood that this invention is susceptible to modification in order to adapt it to different usages and conditions and, accordingly, it is desired to comprehend such modifications within this invention as may fall within the scope of the appended claims.

I claim:

1. In a fluid operable system; a plurality of fluid motors; each of said motors comprising stroke adjusting means normally urged toward a predetermined minimum stroke; each of said motors also comprising fluid pressure responsive means to urge said stroke adjusting means toward increased stroke position; means connecting each of said fluid operable means with the inlet of the respective motor; a fluid source for supplying actuating fluid to said motors; and flow controlling means connected between said source and each of said motors for automatically maintaining a substantially constant rate of fluid flow to each thereof.

2. In a fluid operable system; a plurality of variable displacement fluid motors connected in parallel; a variable displacement fluid source; means responsive to the discharge pressure of said source for moving the same to decreased stroke position; and means individually responsive to the inlet pressure of each of said motors for urging each of the said motors toward increased stroke position means connected between said source and the inlets of each of said motors for maintaining a substantially constant rate of fluid flow to each of said motors.

3. In a fluid operable system; a fluid source of variable displacement and normally urged toward maximum displacement position; a fluid motor of variable displacement and normally urged toward a predetermined minimum stroke position; fluid pressure responsive means associated with said source for urging the same toward decreased stroke position and hydraulically connected with the discharge side of said source; fluid pressure responsive means associated with said motor operable to urge the same toward increased stroke position and hydraulically connected with the inlet thereof; and flow controlling means connected between the discharge side of said source and the inlet side of said motor and operable automatically for maintaining a substantially constant rate of fluid flow to said motor.

4. In a fluid operable system; a plurality of variable displacement fluid motors which it is desired to operate at substantially constant torque; yielding means associated with each of said motors for urging the same toward reduced displacement position; abutment means for limiting the minimum displacement of each of said motors; fluid pressure responsive means for each of said motors to urge the same toward increased stroke position and connected to receive pressure fluid from the inlet of the associated motor; a pressure source; and flow controlling means serially connected with said source and each of said motors and operable automatically and substantially independently of the pressures in said system for maintaining a constant rate of fluid flow through each of said motors.

5. In a fluid operable system; a plurality of variable displacement fluid motors which it is desired to operate at substantially constant torque; yielding means associated with each of said motors for urging the same toward reduced displacement position; abutment means for limiting the minimum displacement of each of said motors; fluid pressure responsive means for each of said motors to urge the same toward increased stroke position and connected to receive pressure fluid from the inlet of the associated motor; means providing for free flow between the said inlets and the fluid operable means, and means restricting the flow from the fluid operable means to the inlet; a pressure source; and flow controlling means serially connected between said source and each of said motors and operable automatically and substantially independently of the pressures in said system for maintaining a constant rate of fluid flow to each of said motors.

6. In a constant horsepower hydraulic system; a pump having pressure operable stroke reducing means and a motor having pressure operable stroke increasing means; channel means connecting said pump and motor in series; conduit means conveying pressure from said channel means to said pressure operable means; and means in series with said pump and motor for maintaining a substantially constant rate of fluid flow therebetween.

7. In a constant horsepower hydraulic system; a pump having pressure operable stroke reducing means and a motor having pressure operable stroke increasing means; means in series with said pump and motor for maintaining a substantially constant rate of fluid flow therebetween; means connecting the stroke reducing means of said pump with the pressure side of the pump; and means connecting the stroke increasing means of said motor with the inlet side thereof.

WARREN R. TUCKER.

REFERENCES CITED

The following references are of record in the file of this patent:

UNITED STATES PATENTS

| Number | Name | Date |
|---|---|---|
| 2,082,473 | Tyler | June 1, 1937 |
| 2,223,838 | Tweedale | Dec. 3, 1940 |
| 2,272,684 | Vickers | Feb. 10, 1942 |
| 2,343,386 | Poitras et al. | Mar. 7, 1944 |
| 2,413,301 | Ellis | Dec. 31, 1946 |
| 2,414,197 | Gignoux | Jan. 14, 1947 |

FOREIGN PATENTS

| Number | Country | Date |
|---|---|---|
| 181,565 | Great Britain | June 22, 1922 |